April 12, 1938.   C. B. CRAMER   2,114,015
BULLET MOLDING DEVICE
Filed Nov. 16, 1936

INVENTOR
Carl B. Cramer
BY Robt. D. Pearson
ATTORNEY

Patented Apr. 12, 1938

2,114,015

UNITED STATES PATENT OFFICE 2,114,015

BULLET MOLDING DEVICE

Carl B. Cramer, North Hollywood, Calif.

Application November 16, 1936, Serial No. 111,009

12 Claims. (Cl. 22—150)

This invention relates to a bullet molding device.

More specifically defined, the invention pertains to a means for rapidly and accurately molding, at a single operation, a plurality of bullets for use in firearms.

Among the objects of the invention are to provide a device of the multiple mold type arranged in an exceedingly compact form; to provide improved means for directing the molten metal into the mold cavities; to equip the device with improved means for quickly and efficiently shearing off the sprue from each bullet cast; and to construct the molding elements in such a manner that they may be more readily and smoothly withdrawn from the cast bodies of the bullets.

A further object of the invention is to provide bronze inserts for the bullet mold cavities, to facilitate the machining of the bullet formations therein.

Other objects, advantages and features of the invention may hereinafter appear.

Referring in detail to the drawing, which illustrates what is at present deemed to be a preferred embodiment of the invention, Fig. 1 is a plan view of the device, portions of the cover plate being partly broken away on line 1—1 of Fig. 2 to disclose the underlying construction and other portions being broken off in order to contract the view.

Figure 1:
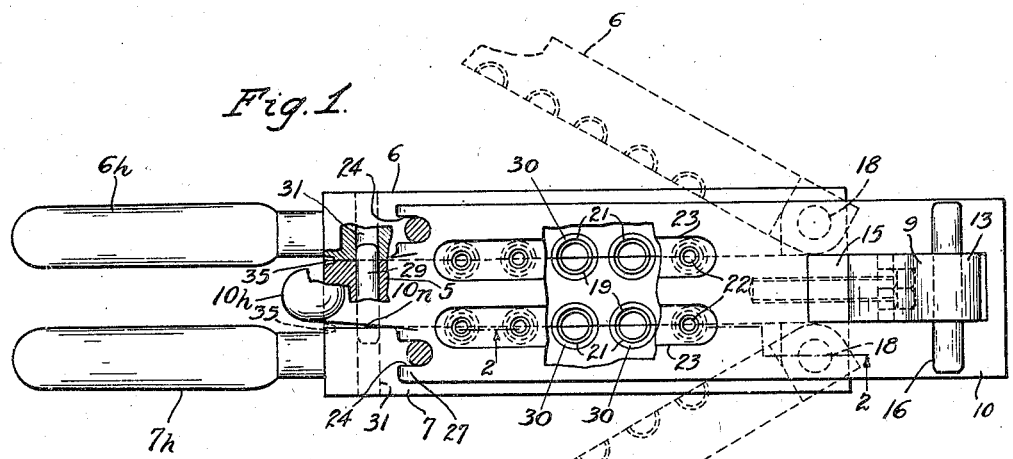

Referring in detail to the drawing, the portion of the device which contains the mold cavities consists of a center bar 5 and the side bars 6 and 7. Said side bars are shown identical in construction, and their parts are therefore lettered in the same manner.

Said center bar is furnished at one end with a crosspiece 8 which fits within a rectangular notch located centrally in that end of the bar 5, the outer side of said crosspiece being substantially flush with the end of said bar. Overlying said crosspiece is a guide member 9 of approximately an inverted L-shape, said member serving to guide the movements of the cover plate 10 and preventing the complete separation of said plate 10 from the remainder of the device. Said plate 10 is furnished with a narrowed portion 10n carrying the knob or handle 10h.

Figure 2:
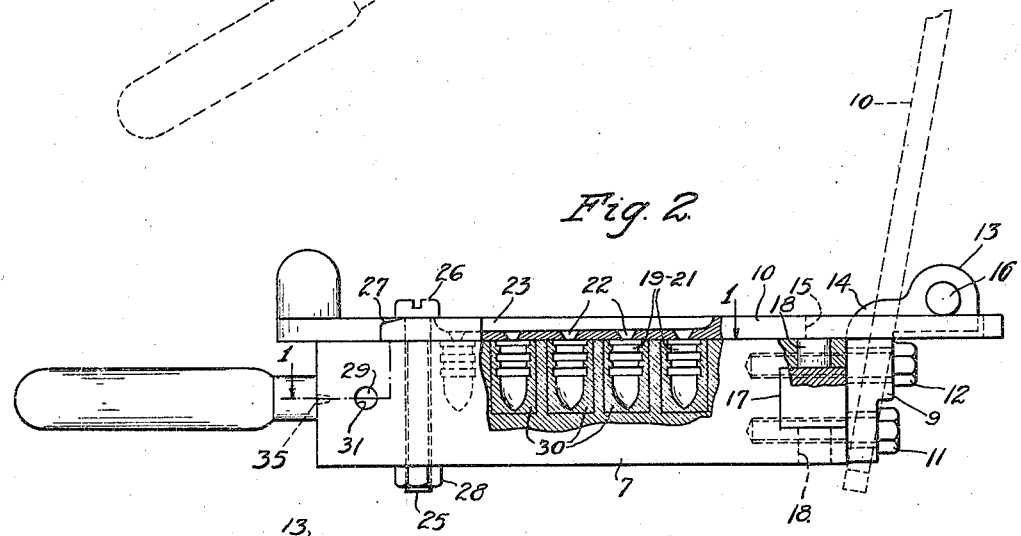
Fig. 2 is a side elevation with portions broken away on line 2—2 of Fig. 1 for similar reasons to those above stated.
Figure 3:
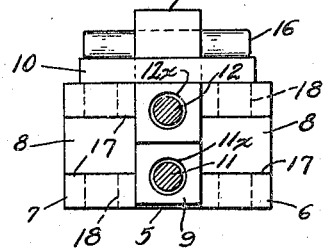
Fig. 3 is an elevation looking at the end of the device at which the hinges are located, the heads of the two bolts shown being broken away.

As viewed in Fig. 2 the vertical portion of member 9 is of a stepped character, and it is attached to the end of the center bar 5 by means of two screw bolts 11 and 12 which respectively pass through the thinner and thicker portions of the guide bar. The crosspiece 8 is semicircularly recessed in its upper and lower edges, thus affording concavities which are snugly engaged by the screw bolts 11 and 12. Holes 11x and 12x through the member 9 are respectively provided for the bolts 11 and 12. Said holes are of considerably greater diameter than the diameter of said bolts in order that vertical and lateral adjustments of the guide member 9 may be had when said bolts are loosened. Said bolts and cross bar therefore combine to hold the cross bar firmly in place.

The guide member 9 has an arcuate head 13 which is supported by a laterally directed neck 14. Said head and neck have a continuous flat surface at each side and the cover plate 10 is furnished with a longitudinal, rectangular slot 15 the sides of which fit against the side surfaces of said head and neck with a working fit. Centrally through the head 13 extends, with a tight fit, a key pin 16 with projecting end portions to prevent detachment of the cover plate 10.

The pivoted end of each side bar is notched at 17 to engage with a working fit the portion of the cross bar 8 which projects at its side of the device and through said cross bar and the bifurcations thus formed extend the hinge pins 18 of the side bars.

A row of semicylindrical mold cavities 19 are formed in the opposite sides of the center bar, as shown, and to cooperate with these cavities like mold cavities 21 are formed in the inner sides of the hinged side bars 6 and 7, the half mold cavities 21 combining with the half mold cavities 19 to form complete, cylindrical mold cavities when the side bars 6 and 7 are in their closed position. The side bars 6 and 7 are furnished with handles 6h and 7h to facilitate their manual manipulation.

Two parallel rows of pouring passages or gateways 22 pass through the cover plate 10 and for each of these rows of holes there is a pouring groove 23. At its free end each corner portion of the cover plate has a locking notch 24 shaped to engage with a wedge fit under the head of an upstanding locking bolt 25, said bolts being shown as having screw heads 26. Said bolts are positioned to perform their locking function when the side bars 6 and 7 are in contact with the center bar 5. The wedging fit mentioned is secured by the bevels 27 at the upper sides of said notches.

Each bolt 25 extends completely through the breadth of a side bar in a screw threaded relation thereto and has a protruding lower portion upon which screws a locking nut 28. By this arrangement an adjustment of the height of each bolt head 26 is provided for, and also a locking of the bolt as adjusted, and the proper snugness of fit of the notched portions of the cover plate under the bolt heads is insured. The adjustments of these locking bolts 25, in combination with the adjustments provided for with regard to the end bolts 11 and 12 already described, enable the operator always to control the cover plate 10 accurately so that whenever it is in the down or mold-contacting position it will fit snugly over the mold cavities and there will be no objectionable fillet of the cast metal formed at the upper ends of the mold cavities.

The pouring passages 22 of the cover plate 10 are of a frusto-conical shape with their smaller ends directed downwardly. Said cover plate is of a sturdy construction and may safely be struck on its attached end with a hammer to force its beveled notched portions 24 snugly into place with relation to the bolts 25, in which position the pouring passages or mold gates 22 will aline properly with the mold cavities. The opposite end of said cover plate will be struck with a hammer, not only to release the plate but also, at the same time, to shear off the sprues at the upper ends of the cast bullets. This shearing action is readily accomplished because of the sharp edge at the base of each frustoconical pouring passage.

The end portion of the center bar 5 which is farthest from the hinges of the side bars has extending through it in a fixed relation a dowel pin 29 with projecting, rounded ends which cooperate with bores 31 in the side bars in order truly to center the guide bars in their closed positions.

It is to be understood that the side bars 6 and 7 will both be held into close contact with the center bar 5 while the cover plate 10 is being pushed or driven to position for receiving the molten metal, and hence, when the cover plate is moved to this position its notched portions 24 will engage the bolts 25 of said side bars and will thus firmly hold said side bars in their closed positions for the pouring operation.

To open the mold, after the cover plate has been operated as above stated to shear off the sprues, the side bars are swung outwardly by means of their handles to release the molded bullets. As the side bar pivots 19 are outwardly offset from alinement with the rows of mold cavities, a slight shearing or wiping action takes place between the cavitated portions of the side bars and the molded bullets in contact with them. Therefore a cleaner separation of each side bar from the cast metal is effected than would result if the pivots of said bars alined with the rows of mold cavities.

A bore 35 is made in the free end of the center bar 5 for the insertion of a suitable tool to aid in separating said bar from either of the side bars in case the center bar adheres to either of the side bars when the mold is opened.

It will also be noted that the bullet cavities 19—21 are provided with bronze inserts 30, which are preferably welded or brazed into the bore 19—21 and are then machined out as shown. The metal out of which the bullets are cast (usually lead) will separate more readily from the bronze than it would from the cast iron, or steel, of which the die is preferably made.

I claim:

1. In a bullet molding device, a plurality of bars which are swingable with relation to each other to and from a contacting position, said bars having part mold cavities which cooperate to form complete mold cavities when said bars are in the contacting position, and a cover plate slidably attached to said device and having gateways to direct the molten metal into said complete mold cavities, said cover plate being adapted to be struck a blow and thus be given a sliding movement resulting in a shearing off at said gateways of the sprues from the cast bullets.

2. The subject matter of claim 1 and, said bars having locking means engageable by said cover plate when it is in the pouring position to lock them in their contacting relation, said cover plate releasing said locking means when it is moved to perform aforesaid sprue-shearing operation.

3. In a bullet molding device, a plurality of bars which are swingable with relation to each other to and from a contacting position, said bars comprising a central bar and a bar at each side thereof, said bars having part mold cavities which cooperate to form two rows of complete mold cavities when the bars are in the contacting relation, and a cover plate slidably attached to said device, said cover plate having through it gateways to deliver the molten metal to said complete mold cavities, each of said side bars having locking means engageable by said cover plate when it is in the pouring position to lock all the bars in their contacting relation, said cover plate being slidable to a position wherein it releases said locking means.

4. The subject matter of claim 3 and, said gateways of said cover plate having sharp edge portions adapted to shear off the sprues from the cast bullets as the cover plate is moved from aforesaid locking position.

5. In a bullet molding device, bars hinged together and swingable to and from a contacting position wherein mold cavities are formed by and between them, said bars having locking elements, and a cover plate slidably connected with said bars and having through it gateways registrable with said mold cavities, said cover plate also having beveled portions which cooperate with said locking elements to lock the bars in their contacting position when said gateways are in register with the mold cavities, said beveled portions at such a time engaging said locking elements with a wedging fit and thereby gripping the cover plate against the mold bars.

6. The subject matter of claim 5 and, said locking elements consisting of upstanding bolts having heads the under sides of which are contacted by aforesaid beveled portions of the cover plate.

7. In a bullet molding device, bars hinged together and swingable to and from a contacting position wherein mold cavities are formed by and between them, and a cover plate having gateways through it, said cover plate being slidably connected with said bars for movement to and from which the gateways thereof register with said mold cavities, said bars having means engageable by said cover plate with a wedging fit to force the cover plate toward the mold cavities when its gateways are moved to the pouring position.

8. The subject matter of claim 7 and, said means consisting of bolts under the heads of which portions of the cover plate are slidable with a wedging fit.

9. In a bullet molding device, bars hinged together and swingable to and from a contacting position wherein mold cavities are formed by and between them, a cover plate having gateways through it, a guide member having bolt holes through it, bolts of less diameter than said holes passing through them and screwing into that end portion of the device, whereby said guide member is secured to said device in an adjustable manner, said cover plate having a slotted end portion which fits against the side portions of said guide member with a working fit and which is retained from detachment from the device by means of the head of said guide member, and locking means carried by the opposite end portion of said device under which the free end portion of said cover plate fits when the latter is moved to a position wherein the gateways thereof are in register with said mold cavities, said locking means locking said members in the contacting position for the metal-pouring operation.

10. In a bullet molding device, bars hinged together and swingable to and from a contacting position wherein mold cavities are formed by and between them, a cover plate having gateways through it, said cover plate also having a longitudinal slot in one end portion thereof, a vertically adjustable guide member secured to one end portion of the device, said guide member extending through the slot of said cover plate with a working fit and the portion thereof which protrudes through said slot having lateral extensions which prevent the complete withdrawal of the cover plate from the device, said cover plate being swingable and slidable upon said guide member and said extensions of the guide member cooperating with the cover plate to position the slotted end portion thereof in alinement with the mouths of said mold cavities, and vertically adjustable locking means carried by the opposite end portion of the device to releasably hold the hinged bars thereof in their contacting positions, said cover plate being slidable to and from a position wherein it causes said locking means to operate, said locking means at such times cooperating with aforesaid guide member to maintain the cover plate in a position wherein its gateways are in registry with said mold cavities.

11. In a bullet molding device, a center bar having part mold cavities in opposite sides thereof, two cooperating side bars, one at each side of said center bar and swingable into a contacting relation thereto, each of said side bars having part mold cavities to cooperate with the mold cavities of the center bar when such side bar is swung to its contacting position, there being a notch cut across one end of said center bar, a cross-piece having its central portion seated in said notch and end portions projecting beyond the sides of said center bar, one end portion of each of said side bars being pivotally connected with a projecting end portion of said crosspiece, a cover plate having through it gateways to conduct molten metal to said mold cavities, said cover plate having a longitudinally slotted end portion, a guide member having through it bolt holes, bolts passing through said holes whereby said guide member is secured to the end portion of said center bar which is provided with aforesaid notch, said bolts passing through semi-circular recesses provided for them in opposite sides of said crosspiece, said guide member engaging the outer side of said crosspiece to aid in holding the same in place when said bolts are in the securing position, the slotted portion of said cover plate having a working fit upon said guide member and said guide member having lateral extensions to prevent a complete separation of said cover plate therefrom, said cover plate being swingable to and from a position wherein the gateways therethrough register with said mold cavities.

12. A bullet molding device comprising a set of three substantially straight molding bars, one of said bars being a central bar to one end portion of which and at opposite sides of which the other two bars are pivotally joined each at the same end, thus producing an assemblage of three cooperating molding bars which, when in the molding position are in a laterally contacting relation to each other, said central bar having a row of part mold cavities in its opposite sides which, in said contacting relation of the bars cooperate with like part cavities in the side bars to form complete mold cavities, said complete mold cavities having mouth portions which are located in the edge portions of the assembled contacting bars, the free end portions of the bars which cooperate with said central bar constituting handles for swinging said two bars to and from a contacting mold-forming relation to said central bar, a cover plate mounted upon said three bars to slide to and from a position wherein it locks all of said bars together in their contacting relation, said cover plate having gates through it which register with the mouths of said complete mold cavities when said plate is in locking position.

CARL B. CRAMER.